US005986818A

United States Patent [19]
Hashimura

[11] Patent Number: 5,986,818
[45] Date of Patent: *Nov. 16, 1999

[54] GRADIENT INDEX ASPHERICAL LENS

[75] Inventor: Junji Hashimura, Sakai, Japan

[73] Assignee: Minolta Co, Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/573,324

[22] Filed: Dec. 15, 1995

[30] Foreign Application Priority Data

Dec. 21, 1994 [JP] Japan ................................. H6-318474
Jan. 9, 1995 [JP] Japan ................................. H7-001253

[51] Int. Cl.$^6$ ............................. G02B 1/10; G02B 13/18; G02B 15/14
[52] U.S. Cl. ......................... 359/653; 359/654; 359/676; 359/708; 359/718
[58] Field of Search .................................. 359/652, 653, 359/654, 708, 676, 718, 719

[56] References Cited

U.S. PATENT DOCUMENTS

| 4,968,117 | 11/1990 | Chern et al. | 359/630 |
| 5,159,495 | 10/1992 | Hamblen | 359/731 |
| 5,327,290 | 7/1994 | Fukushima et al. | 359/692 |
| 5,638,479 | 6/1997 | Takami et al. | 385/124 |

FOREIGN PATENT DOCUMENTS

| 2051116 | 8/1988 | Japan . |
| 4063312 | 7/1990 | Japan . |

OTHER PUBLICATIONS

"Design of a Gradient–Index Photographic Objective", by L. Atkinson, Applied Optics, vol. 21, No. 6, Mar. 15, 1992.

Primary Examiner—Scott J. Sugarman
Attorney, Agent, or Firm—Price Gess & Ubell

[57] ABSTRACT

A gradient index lens has a base lens and a resin layer. The resin layer is formed on a surface of the base lens. The resin layer has an aspherical surface. The base lens has a gradient index.

26 Claims, 8 Drawing Sheets

FNO=4.10

-0.5  0.5
SPHERICAL  SINE
ABERRATION  CONDITION

Y'=21.6

-0.5  0.5
ASTIGMATISM

Y'=21.6

-5.0  5.0
DISTORTION %

FNO=5.57

-0.5  0.5
SPHERICAL  SINE
ABERRATION  CONDITION

Y'=21.6

-0.5  0.5
ASTIGMATISM

Y'=21.6

-5.0  5.0
DISTORTION %

FNO=7.61

-0.5  0.5
SPHERICAL  SINE
ABERRATION  CONDITION

Y'=21.6

-0.5  0.5
ASTIGMATION

Y'=21.6

-5.0  5.0
DISTORTION %

GRADIENT INDEX ASPHERICAL LENS

BACKGROUND OF THE INVENTION

1. Field of the Invention

The present invention relates to a gradient index aspherical lens, and more particularly, to a gradient index aspherical lens suitable for use in a zoom lens system.

2. Description of the Prior Art

In the art of lenses for use in cameras and the like, it has been attempted to effectively correct aberrations by using gradient index lenses to thereby reduce the number of lens elements (Japanese Laid-open Patent Application No. H2-51116). Also, it has been attempted to correct aberrations by using aspherical lenses to thereby reduce the number of lens elements (U.S. Pat. No. 5,327,290).

The gradient index lens having only spherical surfaces is capable of correcting chromatic aberration and Petzval sum by itself. However, since the degree of freedom for aberration correction is insufficient, it is after all impossible to realize each lens unit of a zoom lens system by one lens element. This is because at least two radial gradient index lenses are necessary in order to correct all of the Seidel aberrations simultaneously in gradient index lenses having only spherical surfaces (see "Design of a Gradient-Index Photographic Objective", by L. G. Atkinson et al., Appl. Opt. Vol. 21, No. 6,993 [1982]).

On the other hand, since chromatic aberration and Petzval sum cannot be corrected only by using aspherical surfaces, each lens unit necessarily includes at least two lens elements. Therefore, in order to realize each lens unit of the zoom lens system by one lens element, it is indispensable to use an aspherical surface in the gradient index lens to secure a required degree of freedom.

Japanese Laid-open Patent Application No. H4-63312 discloses a gradient index single lens formed to be aspherical which is used as an objective for an optical disk. However, how the gradient index lens is formed to be aspherical is not described. While some methods have conventionally been known to form a gradient index lens to be aspherical, in order to manufacture an aspherical gradient index lens as disclosed by Japanese Laid-open Patent Application No. H4-63312, it is necessary to use a method such as an aspherical surface manufacturing method to form an aspherical configuration by grinding (by so-called generating) and an aspherical surface manufacturing method by glass molding.

However, the former method presents a problem that it is difficult to reduce the cost of the optical system because of the high cost of the lenses. On the other hand, the latter method presents a problem that it is very difficult to set the optical axis of the aspherical surface and the center of gradient (i.e. the symmetry axis of the gradient) so as to coincide with each other and a problem that it is difficult to obtain a desired gradient index since the gradient configuration is changed by molding. Therefore, it is difficult to manufacture a gradient index aspherical lens by a method to directly process a lens having a gradient index, and even if it can be manufactured, the lens will be rather expensive.

SUMMARY OF THE INVENTION

An object of the present invention is to provide a low-cost gradient index aspherical lens easily manufactured and suitable for mass production.

To achieve the above-mentioned object, a gradient index lens of the present invention is provided with a base lens having a gradient index, and a resin layer formed on a surface of said base lens. The resin layer has an aspherical surface.

According to such a feature, the base lens whose medium has a gradient index is capable of being manufactured independently of the resin layer, so that the gradient configuration is not changed by molding and that the optical axis of the aspherical surface and the center of gradient are easily set so as to coincide with each other.

BRIEF DESCRIPTION OF THE DRAWINGS

This and other objects and features of this invention will become clear from the following description, taken in conjunction with the preferred embodiments with reference to the accompanied drawings in which.

DESCRIPTION OF THE PREFERRED EMBODIMENTS

Figure 1:
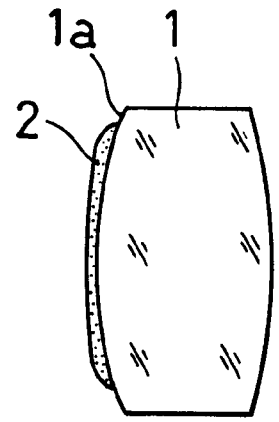
FIG. 1 is a cross-sectional view showing a first embodiment of the present invention.

Hereinafter, embodiments of the present invention will be described with reference to the drawings. FIG. 1 is a cross-sectional view showing a first embodiment of the gradient index aspherical lens. As shown in the figure, the first embodiment is characterized in that a resin layer 2 having an aspherical configuration is formed on a lens surface 1a of a base lens (i.e. gradient index lens) 1 whose medium has a gradient index. That is, the first lens unit can be referred to as a so-called composite aspherical lens with a gradient index lens as the base lens 1 since the resin layer 2 for providing the gradient index lens with an aspherical configuration is laminated on the lens surface 1a.

The gradient index of the base lens 1 may be an arbitrary gradient index such as radial gradient index (the direction of gradient index is a direction vertical to the optical axis) and axial gradient index (the direction of gradient index is parallel to the optical axis). In particular, when each lens unit of a zoom lens system desirably consists of one lens element, the radial gradient index is preferable since chromatic aberration and Petzval sum can be corrected by a single gradient index lens if the gradient index is radial. On the other hand, when the axial gradient index lens is formed to be aspherical, the effect of aberration correction can be allotted to both the gradient index and the aspherical surface, so that the magnitude of the gradient index and the amount of the aspherical surface can be reduced. This is desirable in view of manufacture.

The material of the resin layer 2 must transmit light of a predetermined wavelength. For example, a material which hardens by the irradiation of light such as ultraviolet light is desirable in view of manufacture.

Figure 2:
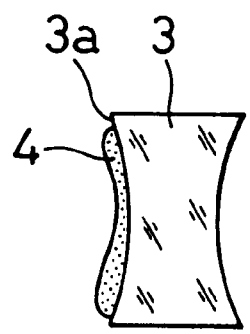
FIG. 2 is a cross-sectional view showing a second embodiment of the present invention.

FIG. 2 is a cross-sectional view showing a second embodiment of the gradient index aspherical lens. While the base lens 1 constituting the first embodiment is a bi-convex lens, a base lens 3 constituting the second embodiment is a bi-concave lens. A resin layer 7 having an aspherical configuration is formed on a lens surface 3a of the base lens 3. Thus, the configuration of the base lens may be arbitrary, and the lens surface is not limited to a convex surface like the lens surface 1a (FIG. 1) and a concave surface like the lens surface 3a (FIG. 2) but may be a plane surface.

Figure 7A:
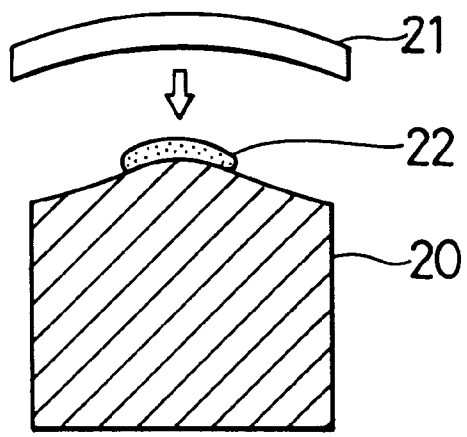
FIGS. 7A to 7C cross-sectionally shows a manufacturing method of a gradient index aspherical lens of the present invention one side surface of which is aspherical.
Figure 7B:
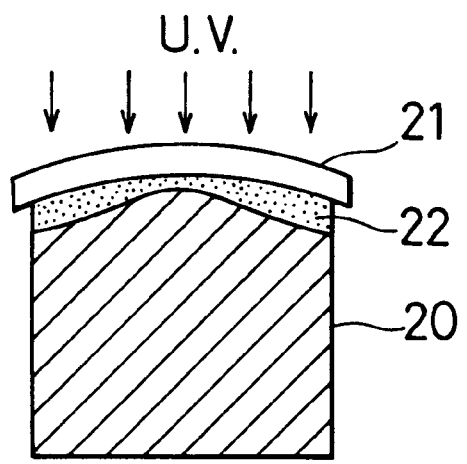
Figure 7C:
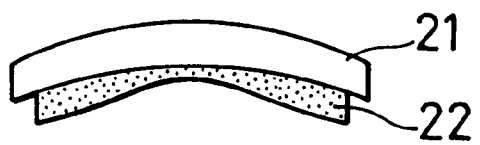

Subsequently, a manufacturing method of the gradient index aspherical lens having an aspherical surface on its one side surface like the first and second embodiments will be described. FIGS. 7A to 7C show an example of the manufacturing method of the gradient index aspherical lens of the present invention one side surface of which is aspherical. The process is as follows:

In FIG. 7A, a base lens 21 is put on a mold 20 with a resin 22 therebetween. The resin 22 hardens by ultraviolet light.

In FIG. 7B, ultraviolet light (U.V.) is irradiated to the connection between the base lens 21 and the resin 22. Since the base lens 21 transmits ultraviolet light, the resin 22 receiving the ultraviolet irradiation polymerically hardens.

In FIG. 7C, the base lens 21 and the resin 22 connected to each other are detached from the mold 20.

The gradient index aspherical lens one side surface of which is formed to be aspherical is thus obtained.

Figure 3:
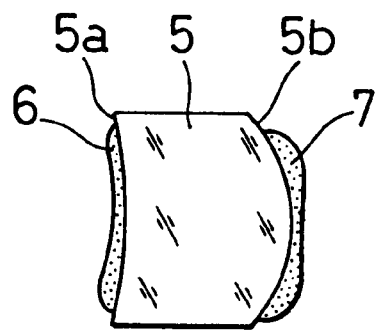
FIG. 3 is a cross-sectional view showing a third embodiment of the present invention.

FIG. 3 is a cross-sectional view showing a third embodiment of the gradient index aspherical lens. While the first and second embodiments have aspherical surfaces on their one side surfaces, the third embodiment has aspherical surfaces on its both side surfaces. Specifically, resin layers 6 and 7 having aspherical configurations are formed on lens surfaces 5a and 5b of a base lens 5 which is a gradient index lens.

Figure 8A:
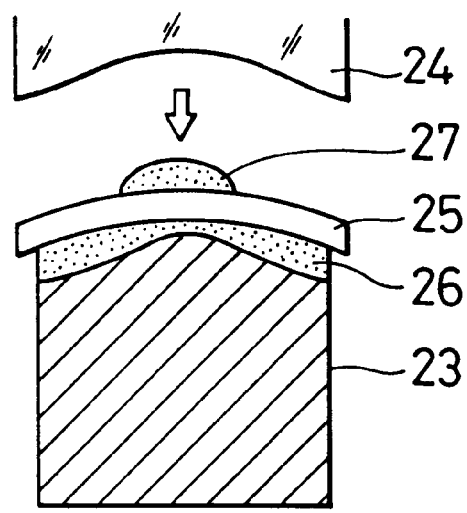
FIGS. 8A to 8C cross-sectionally shows a manufacturing method of a gradient index aspherical lens of the present invention both side surfaces of which are aspherical.
Figure 8B:
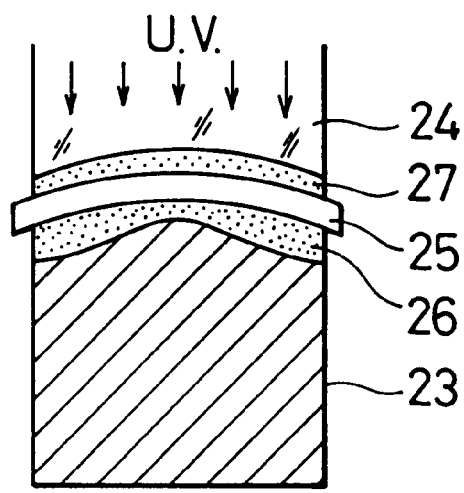
Figure 8C:
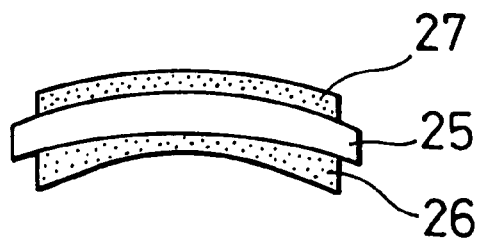

The gradient index aspherical lens both side surfaces of which are aspherical like the third embodiment (FIG. 3) is obtained by performing for each surface the above-described manufacturing method (FIGS. 7A to 7C) of the gradient index aspherical lens one side surface of which is aspherical. However, according to a manufacturing method (FIGS. 8A to 8C) described below, aspherical surfaces can be formed on both side surfaces only by a single ultraviolet irradiation. FIGS. 8A to 8C show an example of the manufacturing method of the gradient index aspherical lens of the present invention both side surfaces of which are aspherical. The process is as follows:

In FIG. 8A, a resin 26 which hardens by ultraviolet light is put on a mold 23, a base lens 25 having a gradient index is put on the resin 26, a resin 27 which hardens by ultraviolet light is put on the base lens 25, and a mold 24 which transmits ultraviolet light is put on the resin 27.

In FIG. 8B, ultraviolet light (U.V.) is irradiated from the side of the mold 24 to the connection among the base lens 25 and the resins 26 and 27. Since the mold 24 transmits ultraviolet light, the resins 26 and 27 receiving the ultraviolet irradiation hardens.

In FIG. 8C, a component consisting of the base lens 25 and the resins 26 and 27 is detached from the molds 23 and 24.

The gradient index aspherical surface both side surfaces of which are formed to be aspherical is thus obtained.

Figure 4:
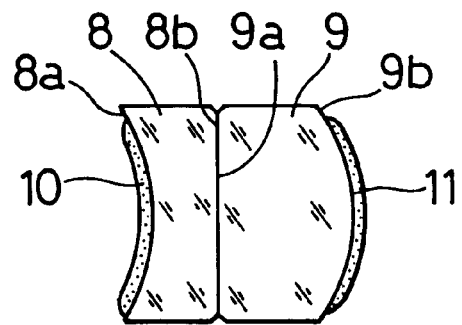
FIG. 4 is a cross-sectional view showing a fourth embodiment of the present invention.

FIG. 4 is a cross-sectional view showing a fourth embodiment of the gradient index aspherical lens. While one base lens 5 is used in the third embodiment, two base lenses 8 and 9 cemented to each other are used in the fourth embodiment. The base lens 8 and the base lens 9 cemented at lens surfaces 8b and 9a have the same radial gradient index configuration and their refractive indices completely accord with each other at the boundary surfaces. A resin layer 10 having an aspherical configuration is formed on a lens surface 8a of the base lens 8, and a resin layer 11 having an aspherical configuration is formed on a lens surface 9b of the base lens 9.

Figure 9A:
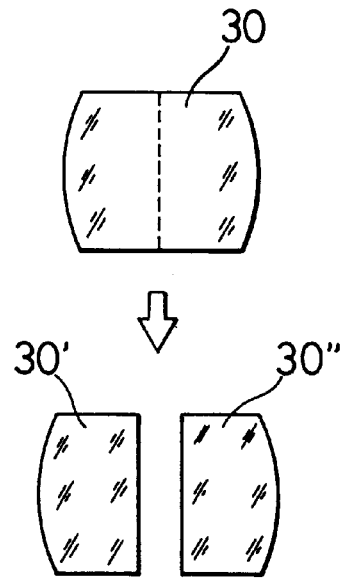
FIGS. 9A to 9C cross-sectionally shows a manufacturing method of a gradient index aspherical lens of the present invention both side surfaces of which are aspherical.
Figure 9B:
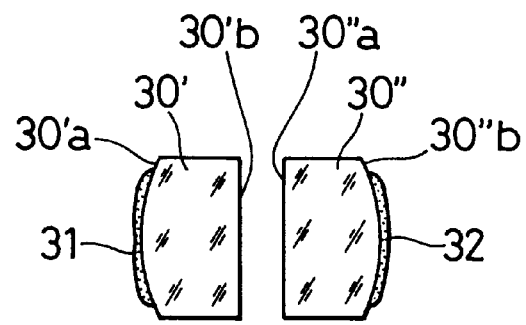
Figure 9C:
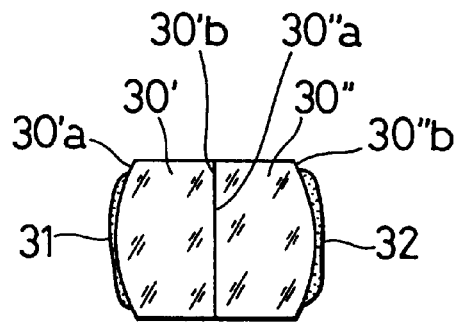

In manufacturing a gradient index aspherical lens in which two base lenses are cemented to each other like the fourth embodiment (FIG. 4), the base lenses (the base lens 8 and the base lens 9 herein) manufactured separately may be used. However, according to a manufacturing method (FIGS. 9A to 9C) described below, there is no difference in refractive index at the boundary of the cemented gradient index lenses and the manufacture of the bi-aspherical lens is facilitated. Thus, this method is preferably used. FIGS. 9A to 9C show an example of the manufacturing method of the gradient index aspherical lens both side surfaces of which are aspherical. The process is as follows:

In FIG. 9A, a gradient index base lens 30 is made, and the base lens 30 is divided into a base lens 30' and a base lens 30".

In FIG. 9B, by forming resin layers 31 and 32 on lens surfaces 30'a and 30"b of the base lenses 30' and 30", the lenses 30' and 30" are formed to have aspherical surfaces.

In FIG. 9C, a lens surface 30'b and a lens surface 30"a are cemented so that the gradient index of the cemented lenses 30' and 30" formed to have aspherical surfaces is the same as that of the base lens 30.

The gradient index aspherical lens both side surfaces of which are formed to be aspherical is thus obtained.

Figure 5:
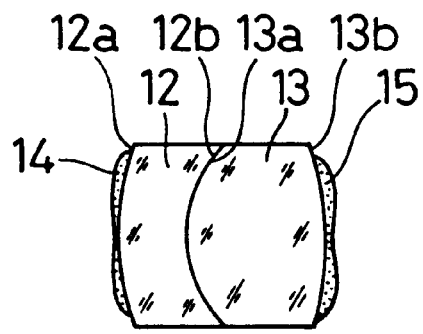
FIG. 5 is a cross-sectional view showing a fifth embodiment of the present invention.

FIG. 5 is a cross-sectional view showing a fifth embodiment of the gradient index aspherical lens. While the cemented surfaces of the base lenses 8 and 9 constituting the fourth embodiment are plane surfaces, the cemented surfaces of base lenses 12 and 13 constituting the fifth embodiment are spherical surfaces. A resin layer 14 having an aspherical configuration is formed on a lens surface 12a of the base lens 12, and a resin layer 15 having an aspherical configuration is formed on a lens surface 13b of the base lens 13. Thus, in the gradient index bi-aspherical lens of a type whose base lens is a cemented lens, the configurations of cemented surfaces of the two base lenses may be arbitrary. If there is no problem in view of manufacture, the cemented surfaces are not limited to plane surfaces like the lens surfaces 8b and 9a (FIG. 4) and spherical surfaces like the lens surfaces 12b and 13a (FIG. 8) but may be slanting surfaces.

With respect to the bi-aspherical lens of a type in which two base lenses are cemented to each other like the fourth and fifth embodiments, the base lenses to be cemented are not necessarily made of materials of the same gradient index. For example, in the fifth embodiment (FIG. 5), the base lenses 12 and 13 may have different gradient indices. Alternatively, one of the base lenses 12 and 13 may be a gradient index lens and the other may be a homogeneous lens.

Thus, if two (or three or more) base lenses having different gradient indices are used, the degree of freedom of design for the aberration correction increases at the time of the optical design. In addition, from the viewpoint of the correction of chromatic aberration, since the effect of the correction of chromatic aberration by the cemented lens as well as the effect of the correction of chromatic aberration of the medium in the gradient index lens can be provided, the distribution of dispersion of each gradient index lens can be reduced, so that the manufacture of the gradient index lens is facilitated.

Figure 6:
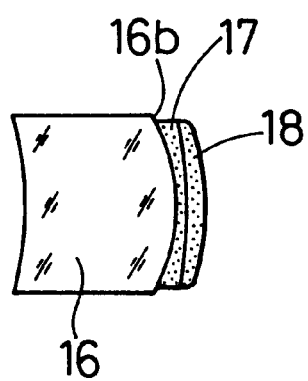
FIG. 6 is a cross-sectional view showing a sixth embodiment of the present invention.

FIG. 6 is a cross-sectional view showing a sixth embodiment of the gradient index aspherical lens. Like the first and second embodiments, the sixth embodiment is a gradient index aspherical lens having an aspherical surface on its one side surface, and is characterized in that two resin layers 17 and 18 are formed to overlap each other on a lens surface 16b of a base lens 16 which is a gradient index lens.

Thus, a plurality of aspherical resin layers may be formed on the base lens. In this case, for example, by gradually varying the refractive indices of the aspherical resin layers, an effect the same as that of a gradient index aspherical lens having an axial gradient index can be provided.

Thus, in any of the first to sixth embodiments, since the base lenses are manufactured independently of the resin layers, the variation in gradient index configuration which is apt to be caused at a mold in forming aspherical surfaces does not occur. In addition, it is easy to set the optical axis of the aspherical surface and the center of gradient so as to coincide with each other. On the other hand, since the resin layers are manufactured independently of the base lenses, the formation of aspherical surfaces is easily performed at a low cost compared to the formation of aspherical surfaces by generating. Therefore, the above-described embodiments are all easily manufactured, suitable for mass production and can be realized at a low cost. In particular, the composite aspherical lens is superior to the other types in mass production.

Further, since chromatic aberration and Petzval sum can be corrected by the lens itself because of the gradient index of the base lens and the required degree of freedom can be secured by the aspherical surface, the number of lens elements of an optical system can be reduced by using the gradient index aspherical lens of the first to sixth embodiment in the optical system. For example, each lens unit of a zoom lens system can be formed out of one lens element (in an application arrangement described later, a front lens unit Gr1 of a zoom lens system consists of one lens element). In addition, since the load of aberration correction is allotted to the gradient index and the aspherical surface by combining them, the magnitude of gradient index and the amount of aspherical surface are reduced, so that the manufacture is facilitated.

Figure 10:
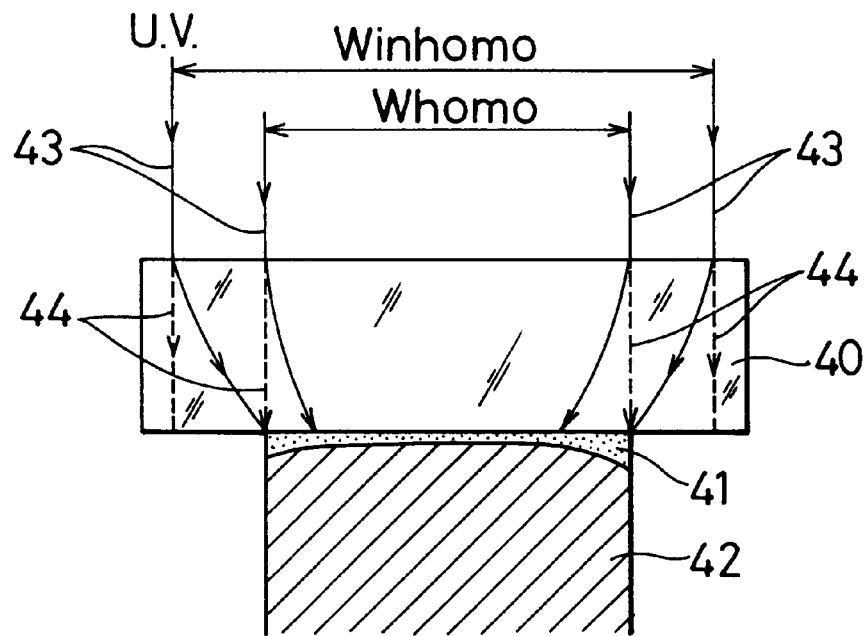
FIG. 10 is a view of assistance in explaining an ultraviolet irradiation width in the manufacture of the gradient index aspherical lens.

Referring to FIG. 10, the ultraviolet irradiation width in the above-described manufacturing method of the gradient index aspherical lens (FIGS. 7A to 7C and 8A to 8C) will be described. Reference numeral 40 represents a base lens. Reference numeral 41 represents a resin layer having an aspherical configuration. Reference numeral 42 represents a mold. Reference numeral 43 represents the optical path of ultraviolet light in the ultraviolet irradiation when the base lens 40 is a gradient index lens (convergent radial type plano lens). Reference numeral 44 represents the optical path of ultraviolet light in the ultraviolet irradiation when the base lens 40 is a homogeneous lens. $W_{homo}$ represents the ultraviolet irradiation width when the base lens 40 is a homogeneous lens. $W_{inhomo}$ represents the ultraviolet irradiation width when the base lens 40 is a gradient index lens.

In forming the resin layer 41, since the polymerical hardening is caused by ultraviolet irradiation, it is necessary for the ultraviolet light to pass through the gradient index lens 40 to irradiate the entire surface of the resin layer 41. However, as shown in FIG. 10, the ultraviolet irradiation width $W_{homo}$ (for example, in the case of a piano lens, $W_{homo}$ may be $W_{homo} \geq 2R_{re}$ where $R_{re}$ is the outside radius of the aspherical resin layer 41) necessary when the base lens 40 is a homogeneous lens and the ultraviolet irradiation width $W_{inhomo}$ necessary when the base lens 40 is a gradient index lens are normally different. Therefore, when the aspherical resin layer 41 is formed with a gradient index lens as the base lens 40, it is necessary to set the ultraviolet irradiation width to a predetermined irradiation width which depends on the refractive power of the base lens 40.

For example, when the base lens 40 is a radial gradient index lens, if its gradient index N(r) is expressed by the following expression (1):

$$N(r) = N_{00} + N_{10} \cdot r^2 + N_{20} \cdot r^4 + N_{30} \cdot r^6 + \ldots \quad (1)$$

where r is the distance from the optical axis in a direction vertical to the optical axis, and $N_{10}$ is the $r^{2i}$ gradient index coefficient (here, i=1, 2, 3, ...), the optical path of a meridional ray incident on the base lens 40 is represented by h and α of expressions (2) to (5) with respect to the following cases (a) and (b):

(a) When $N_{10} < 0$ (convergent type radial gradient index), $$h = h_0 \cdot \cos(k \cdot z) - \alpha_0 \cdot \frac{\sin(k \cdot z)}{k} \cdot N_{00} \quad (2)$$

$$\alpha = h_0 \cdot k \cdot N_{00} \sin(k \cdot z) + \alpha_0 \cdot \cos(k \cdot z) \quad (3)$$

$$k^2 = \frac{-2N_{10}}{N_{00}}.$$

$$h = h_0 \cdot \cosh(k \cdot z) - \alpha_0 \cdot \frac{\sinh(k \cdot z)}{k} \cdot N_{00} \quad (4)$$

$$\alpha = -h_0 \cdot k \cdot N_{00} \cdot \sinh(k \cdot z) + \alpha_0 \cdot \cosh(k \cdot z) \quad (5)$$

$$k^2 = \frac{2N_{10}}{N_{00}}.$$

Here, α is the direction (inclination) of the optical axis, $\alpha_0$ is the inclination of incidence, h is the distance from an optical axis AX in a direction vertical to the optical axis AX, $h_0$ is the height of incidence, $h_1$ is the height of exit, z is the distance from the vertex of the object side surface of the lens in a direction parallel to the optical axis AX, and $z_0$ is the axial thickness of the gradient index lens.

Figure 11:
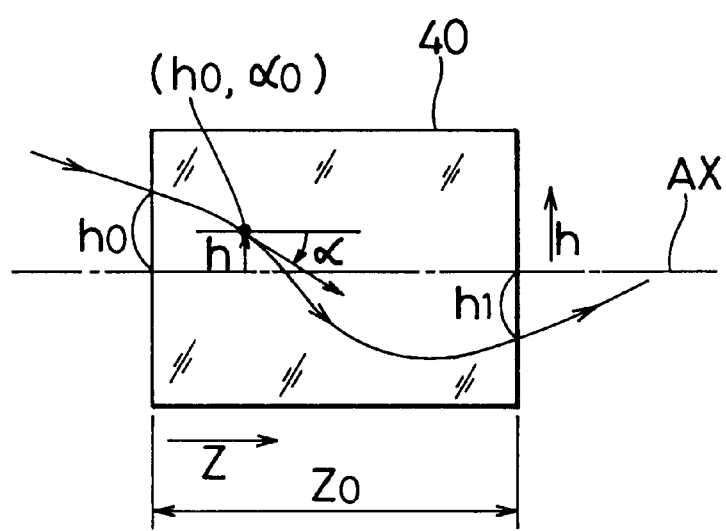
FIG. 11 shows an optical path of meridional light in a convergent-type radial gradient index lens.

Therefore, as shown in FIG. 11 (the case of $N_{10}<0$), the light advances while being gradually bent in the medium of the base lens 40 having a gradient index. When an aspherical resin layer is formed on a convergent type radial gradient index plano lens as shown in FIG. 10, if ultraviolet light is irradiated vertically to the lens, it can be irradiated to the entire surface of the resin layer 41 by fulfilling an expression (7) with respect to $h_0$ fulfilling an expression (6) shown below. Thus, the ultraviolet irradiation must be performed in a width which depends not on the configuration of the base lens 40 but on the refractive index thereof. In particular, when the lens has a positive lens configuration and a negative refractive power and when the lens has a negative lens configuration and a positive refractive power, care should be taken.

$$R_{re} = h_0 \cdot \cos(k \cdot z_0) - \alpha_0 \cdot \frac{\sin(k \cdot z_0)}{k} \cdot N_{00} \tag{6}$$

$$W_{inhomo} \geq 2h_0 \tag{7}$$

Subsequently, preferable conditions for the gradient index lenses of the present invention will be described. When the radial gradient index lens is used in a lens unit having a positive refractive power, the following condition (8) is preferably fulfilled:

$$-30 < \frac{N_{10}}{\phi_P^2} < 20 \tag{8}$$

where $N_{10}$ is the quadratic gradient index coefficient of the gradient index lens (here, the gradient index is expressed by the expression (1)), and $\phi_P$ is the refractive power of the positive lens unit.

The condition (8) is a condition to control Petzval sum in the lens unit. When the lower limit of the condition (8) is exceeded, Petzval sum increases toward the negative side. When the upper limit of the condition (8) is exceeded, Petzval sum increases toward the positive side.

When the radial gradient index lens is used in a lens unit having a negative refractive power, the following condition (9) is preferably fulfilled:

$$-20 < \frac{N_{10}}{\phi_M^2} < 30 \tag{9}$$

where $\phi_M$ is the refractive power of the negative lens unit.

The condition (9) is a condition to control Petzval sum in the lens unit. When the lower limit of the condition (9) is exceeded, Petzval sum increases toward the positive side. When the upper limit of the condition (10) is exceeded, Petzval sum increases toward the negative side.

The radial gradient index lens preferably fulfills the following condition (10):

$$\left|\frac{N_{20}}{\phi_G^4}\right| < 1000 \tag{10}$$

where $N_{20}$ is the fourth power gradient index coefficient of the gradient index lens (here, the gradient index is expressed by the expression (1)), and $\phi_G$ is the refractive power of the gradient index lens.

The condition (10) is a condition relating to the gradient index of the gradient index lens. When the limit of the condition (10) is exceeded, the gradient index of the lens is too great, so that the manufacture of such a lens is difficult and even though the lens is formed to be aspherical, the correction of higher-order aberrations is very difficult.

The base lens may be an axial gradient index lens expressed by the following expression (11):

$$N(z) = N_{00} + N_{01} \cdot z + N_{02} \cdot z^2 + N_{03} \cdot z^3 + \ldots \tag{11}$$

where $N_{0i}$ is the $z^i$ gradient index coefficient (here, i=1, 2, 3, . . . ).

The axial gradient index lens preferably fulfills the following condition (12):

$$0.005 < \left|\frac{N_{01}}{\phi_G}\right| < 100 \tag{12}$$

where $N_{01}$ is the primary gradient index coefficient of the gradient index lens (here, the gradient index is expressed by the expression (11)).

The condition (12) is a condition relating to the gradient index of the gradient index lens. When the upper limit of the condition (12) is exceeded, the gradient index of the lens is too great, so that the manufacture of such a lens is difficult and higher-order aberrations are generated. When the lower limit of the condition (12) is exceeded, the gradient index produces hardly any effect of aberration correction, so that the number of lens elements cannot be reduced.

When an aspherical surface is used in the gradient index lens, the aspherical surface preferably fulfills the following condition (13):

$$-6.0 < \frac{\phi_A - \phi_{0A}}{\phi_G} < 6.0 \tag{13}$$

where $0 < H < H_{max}$. Here, H is the height along the lens diameter, $H_{max}$ is the effective lens diameter, $\phi_A$ is the refractive power of a local surface of the aspherical surface, and $\phi_{0A}$ is the refractive power by a reference curvature of the aspherical surface. $\phi_A$ and $\phi_{0A}$ are expressed by the following expressions (13A) and (13B):

$$\phi_A : C_{ALO} \cdot (N'-N) \tag{13A}$$

$$\phi_{0A} : C_0 \cdot (N'-N) \tag{13B}$$

where $C_{ALO}$ is the local curvature at each height of the aspherical surface, $C_0$ is the reference curvature of the aspherical surface, N is the refractive index of the object side medium of the aspherical surface, and N' is the refractive index of the image side medium of the aspherical surface.

The condition (13) is a condition to be fulfilled by an aspherical lens when the aspherical lens is used in the gradient index lens. When the upper limit of the condition (13) is exceeded, aberrations generated at the spherical surfaces of the lens is further degraded by the aspherical surface. When the lower limit of the condition (13) is exceeded, aberrations are over-corrected by the aspherical surface, so that, for example, even if a plurality of aspherical surfaces are used, it is difficult to counteract the over-correction with another aspherical surface.

When an aspherical surface is used in the gradient index lens, it is very preferable that both side surfaces of the gradient index lens are aspherical. If both side surfaces are aspherical, further aberration correction effect is obtained. In that case, it is preferable that aberrations over-corrected by one aspherical surface is corrected by the other aspherical surface.

When the gradient index lens used as the base lens is a radial gradient index lens, its dispersion preferably fulfills the following condition (14):

$$-1.0 < sgn(\phi_G) \cdot \frac{\nu_d(H) - \nu_d(0)}{\nu_d(0)} < 1.0 \quad (14)$$

where when $\phi_G \geq 0$, $sgn(\phi_G)=1$, and when $\phi_G<0$, $sgn(\phi_G)=-1$. Here, $\nu d(H)$ is the Abbe number expressed by a dispersion value $[\nu_d(H)=\{N_d(H)-1\}/\{N_F(H)-N_C(H)\}]$ at a point the height H away from the optical axis in a vertical direction in the gradient index lens. Here, $N_d(H)$ is the refractive index to the d-line at the height H, $N_F(H)$ is the refractive index to the F-line at the height H, and $N_C(H)$ is the refractive index to the C-line at the height H.

The condition (14) is a dispersion distribution condition to be fulfilled by the gradient index lens. When the limits of the condition (14) is exceeded, it is difficult to correct chromatic aberration generated in the lens and the dispersion distribution increases, so that the manufacture of such a lens is difficult.

Numerical data of a zoom lens system (application) having a gradient index aspherical lens according to the present invention are shown in Table 1. In the table, ri (i=1, 2, 3, ...) represents a radius of curvature of an ith surface Si (i=1, 2, 3, ...) counted from the object side, di (i=1, 2, 3, ...) represents an ith axial distance counted from the object side, and Ni (i=1, 2, 3, ...) and $\nu$i (i=1, 2, 3, ...) are a refractive index to the d-line and an Abbe number of an ith lens counted from the object side, respectively. The focal lengths f of the entire lens system at the shortest focal length condition (W), at the middle focal length condition (M) and at the longest focal length condition (L), the f number FNO and the gradient index coefficients of radial gradient of the gradient index lens GRIN 1 are also shown. The surfaces Si marked with asterisks are aspherical and defined by the following expressions representative of the configurations of aspherical surfaces:

$$X = \frac{C \cdot Y^2}{1 + (1 - \varepsilon \cdot Y^2 \cdot C^2)^{\frac{1}{2}}} + \sum_i Ai Y^i$$

where X is the displacement amount from a reference surface along the optical axis, Y is the height in a direction vertical to the optical axis, C is the paraxial curvature, $\varepsilon$ is the conic constant, and Ai is the ith-power aspherical coefficient.

Figure 12:
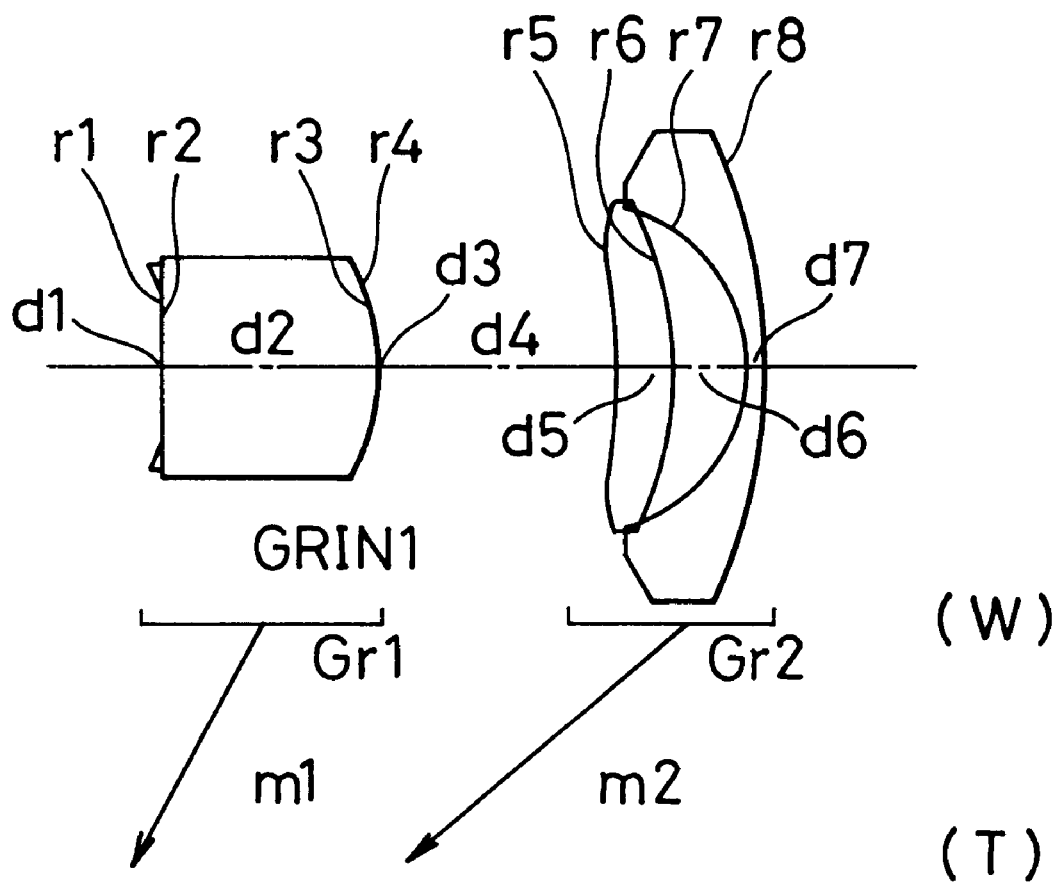
FIG. 12 shows the lens arrangement of an application using an embodiment of the present invention.

FIG. 12 shows the lens arrangement of the zoom lens system application at the shortest focal length condition (W). The zoom lens system comprises from the object side a front lens unit Gr1 and a rear lens unit Gr2. The front lens unit Gr1 consists of a gradient index bi-aspherical lens characterized in that resin layers having aspherical configurations are formed on lens surfaces S2 and S3 of a base lens GRIN 1 whose medium has a gradient index. This bi-aspherical lens corresponds to the previously-described third embodiment (FIG. 3). The loci m1 and m2 in FIG. 12 schematically show the movements of the front and rear lens units Gr1 and Gr2 in zooming from the shortest focal length condition (W) to the longest focal length condition (T).

Figure 13A:
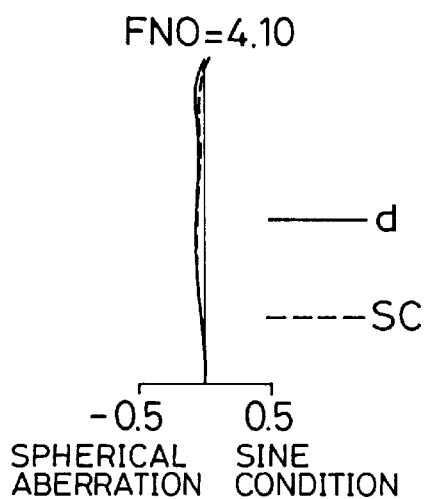
FIGS. 13A to 13I show aberration of the application of FIG. 12.
Figure 13B:
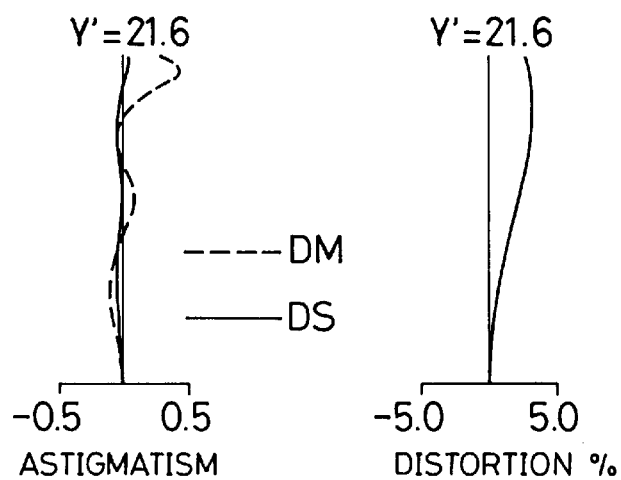
Figure 13C:
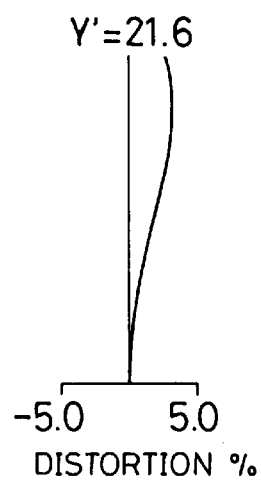
Figure 13D:
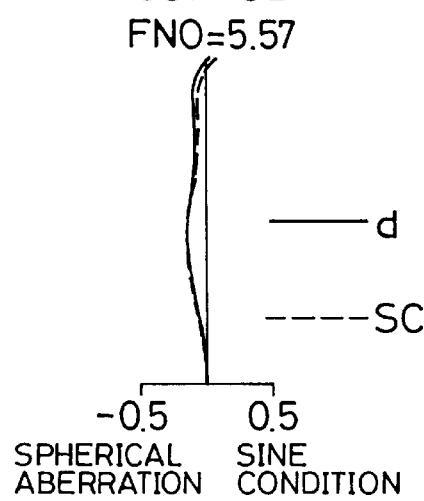
Figure 13E:
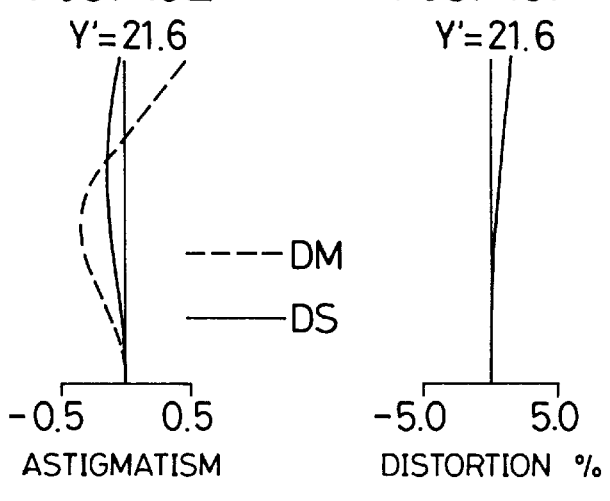
Figure 13F:
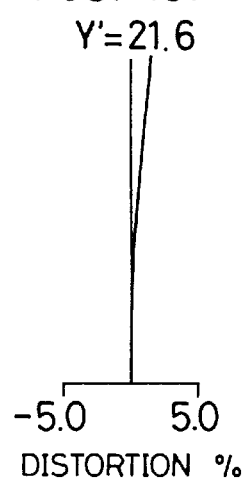
Figure 13G:
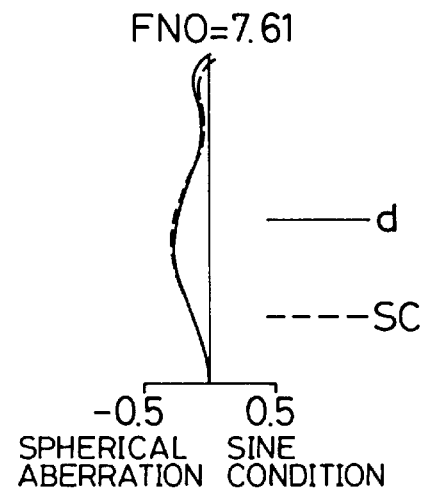
Figure 13H:
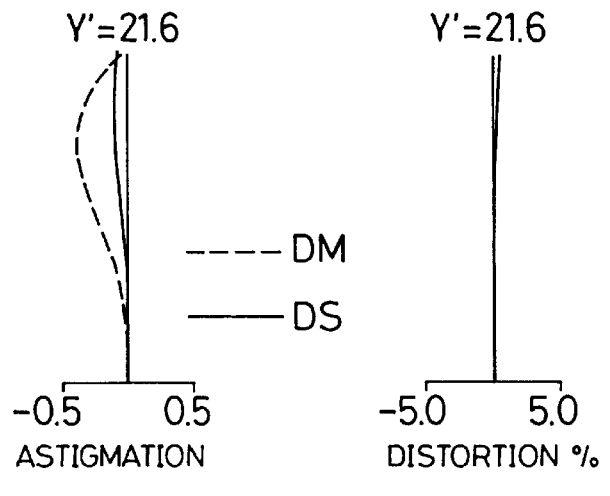
Figure 13I:
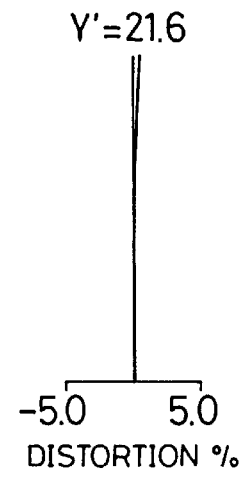

FIGS. 13A to 13I show aberrations of the application arrangement. FIGS. 13A to 13C show aberrations at the shortest focal length condition (W). FIGS. 13D to 13F show aberrations at the middle focal length condition (M). FIGS. 13G to 13I show aberrations at the longest focal length condition. The solid line d represents spherical aberration to the d-line. The broken line SC represents sine condition. The broken line DM and the solid line DS represent astigmatisms to the d-line on the meridional and sagittal image planes, respectively.

Table 1 shows the values of the gradient index aspherical lens (front lens unit Gr1) used in the application arrangement for $N_{10}/\phi_P^2$ of the condition (8), $|N_{20}/\phi_G^4|$ of the condition (10), $(\phi_A-\phi_{0A})/\phi_G$ of the condition (13) and sgn $(\phi_G) \cdot \{\nu_d(H)-\nu_d(0)\}/\nu_d(0)$ of the condition (14).

As described above, the gradient index aspherical lens of the present invention obtained by forming a resin layer having an aspherical configuration on a lens surface of a base lens whose medium has a gradient index is easy to manufacture, suitable for mass production and can be realized at a low cost.

In addition, chromatic aberration and Petzval sum can be corrected only by the gradient index aspherical lens because of the gradient index of the base lens and a required degree of freedom of aberration correction can be secured by the aspherical surface. Therefore, by using the gradient index aspherical lens of the present invention in an optical system, the number of lens elements of the optical system can be reduced. For example, each lens unit of a zoom lens system can be formed out of one lens element. Further, since aberration correction is allotted to the gradient index and the aspherical surface because of their combination, the magnitude of the gradient index and the amount of the aspherical surface are reduced, so that the manufacture is facilitated.

Obviously, many modifications and variations of the present invention are possible in light of the above teachings. It is therefore to be understood that within the scope of the appended claims, the invention may be practiced other than as specifically described.

TABLE 1

(Application)

f = 36.3 to 49.4 to 67.4    FNO = 4.1 to 5.6 to 7.6

| Surface | Radius of Curvature | Axial Distance | Refractive Index | Abbe Number |
|---|---|---|---|---|
| S1* | r1 −190.027 | d1 0.010 | N1 1.51400 | v1 42.83 |
| S2 | r2 −190.027 | d2 12.756 | N2 [GRIN1] | v2 [GRIN1] |
| S3 | r3 −14.674 | d3 0.010 | N3 1.51400 | v3 42.83 |
| S4* | r4 −14.674 | d4 14.223 to 9.748 to 6.414 | | |
| S5* | r5 −31.828 | d5 3.350 | N4 1.58340 | v4 30.23 |
| S6 | r6 −22.124 | d6 4.450 | | |
| S7 | r7 −10.085 | d7 1.000 | N5 1.74400 | v5 44.93 |
| S8 | r8 −33.247 | Σd = 35.798 to 31.324 to 27.990 | | |

Aspherical Coefficients

| S1 | :$\varepsilon$ = 1.0000 |
| --- | --- |
| | A4 = −0.28941 × 10$^{-3}$ |
| | A6 = −0.19512 × 10$^{-6}$ |
| | A8 = −0.87686 × 10$^{-8}$ |
| | A10 = −0.22185 × 10$^{-9}$ |
| | A12 = 0.76907 × 10$^{-11}$ |
| S4 | :$\varepsilon$ = 1.0000 |
| | A4 = 0.92862 × 10$^{-4}$ |
| | A6 = 0.12243 × 10$^{-5}$ |
| | A8 = −0.69016 × 10$^{-7}$ |
| | A10 = 0.12567 × 10$^{-8}$ |
| | A12 = −0.38370 × 10$^{-11}$ |
| S5 | :$\varepsilon$ = 1.0000 |
| | A4 = 0.92881 × 10$^{-4}$ |
| | A6 = −0.18053 × 10$^{-5}$ |
| | A8 = 0.10221 × 10$^{-6}$ |
| | A10 = −0.23353 × 10$^{-8}$ |

TABLE 1-continued

A12 = 0.30980 × 10⁻¹⁰
A14 = −0.22337 × 10⁻¹²
A16 = 0.70534 × 10⁻¹⁵

Gradient Index of GRIN 1 d-line:
$N_{00}$ = 1.77250
$N_{10}$ = 0.51100499 × 10⁻³
$N_{20}$ = −0.84723594 × 10⁻⁵
C-line:
$N_{00}$ = 1.76781
$N_{10}$ = 0.50226358 × 10⁻³
$N_{20}$ = −0.84700000 × 10⁻⁵
F-line:
$N_{00}$ = 1.78333
$N_{10}$ = 0.53287162 × 10⁻³
$N_{20}$ = −0.84700000 × 10⁻⁵

TABLE 2

| Condition (8) 0.333 | | | | Condition (10) 3.589 | |
|---|---|---|---|---|---|
| Condition (13) | | | | Condition (14) | |
| H | S1 | S2 | S4 | H | |
| $0.0H_{max}$ | 0.000 | 0.000 | 0.194 | $0.0H_{max}$ | 0.000 |
| $0.1H_{max}$ | −0.021 | −0.005 | 0.206 | $0.1H_{max}$ | 0.000 |
| $0.2H_{max}$ | −0.083 | −0.019 | 0.236 | $0.2H_{max}$ | −0.002 |
| $0.3H_{max}$ | −0.187 | −0.043 | 0.284 | $0.3H_{max}$ | −0.004 |
| $0.4H_{max}$ | −0.335 | −0.076 | 0.361 | $0.4H_{max}$ | −0.007 |
| $0.5H_{max}$ | −0.528 | −0.115 | 0.490 | $0.5H_{max}$ | −0.011 |
| $0.6H_{max}$ | −0.769 | −0.155 | 0.692 | $0.6H_{max}$ | −0.016 |
| $0.7H_{max}$ | −1.062 | −0.195 | 0.990 | $0.7H_{max}$ | −0.022 |
| $0.8H_{max}$ | −1.403 | −0.237 | 1.446 | $0.8H_{max}$ | −0.030 |
| $0.9H_{max}$ | −1.767 | −0.304 | 2.246 | $0.9H_{max}$ | −0.038 |
| $1.0H_{max}$ | −2.082 | −0.445 | 3.991 | $1.0H_{max}$ | −0.049 |

What is claimed is:

1. A gradient index lens comprising:
a base lens having a gradient index; and
a resin layer formed on a surface of said base lens, said resin layer having an aspherical surface, wherein said gradient index lens has an axial gradient index, and wherein the following condition is fulfilled:

$$0.005 < \left|\frac{N_{01}}{\phi_G^4}\right| < 100$$

where $N_{01}$ is a primary gradient index coefficient of said gradient index lens, and $\phi_G$ is a refractive power of said gradient index lens.

2. A gradient index lens as claimed in claim 1, wherein said resin layer has a property of being hardened by ultraviolet irradiation.

3. A gradient index lens as claimed in claim 1, wherein said resin layer is formed on one surface of said base lens.

4. A gradient index lens as claimed in claim 3, wherein another resin layer is formed on another surface of said base lens.

5. A gradient index lens as claimed in claim 3, another base lens having a gradient index different from that of said base lens is cemented onto another surface of said base lens.

6. A gradient index lens as claimed in claim 1, wherein another resin layer having a refractive index different from that of said resin layer is formed on a surface of said resin layer.

7. A gradient index lens as claimed in claim 1, wherein said base lens has a spherical surface.

8. A gradient index lens as claimed in claim 1, wherein the following condition is fulfilled:
when $0<H<H_{max}$, $$-6.0 < \frac{\phi_A - \phi_{OA}}{\phi_G} < 6.0$$

where H is a height along a lens diameter, $H_{max}$ is an effective lens diameter, $\phi_A$ is a refractive power of local surface of said aspherical surface $\phi_{OA}$ is a refractive power by a reference curvature of said aspherical surface, and $\phi_G$ is a refractive power of said gradient index lens.

9. A gradient index lens as claimed in claim 1, wherein said base lens has a radial gradient index, and wherein the following condition is fulfilled:

$$-1.0 < sgn(\phi_G) \cdot \frac{\nu_d(H) - \nu_d(0)}{\nu_d(0)} < 1.0$$

where $\phi_G$ is a refractive power of said gradient index lens, sgn $(\phi_G)$=1 when $\phi_G \geq 0$, sgn $(\phi_G)$=−1 when $\phi_G<0$, and $\nu d(H)$ is a dispersion value at a point a height H away from an optical axis in a vertical direction in said gradient index lens.

10. A gradient index lens as claimed in claim 1, wherein said gradient index lens constitutes a part of a lens unit having a positive refractive power, and wherein the following condition is fulfilled:

$$-30 < \frac{N_{10}}{\phi_P^2} < 20$$

where $N_{10}$ is a quadratic gradient index coefficient of said gradient index lens, and $\phi_P$ is a refractive power of said lens unit.

11. A gradient index lens as claimed in claim 1, wherein said gradient index lens constitutes a part of a lens unit having a negative refractive power, and wherein the following condition is fulfilled:

$$-20 < \frac{N_{10}}{\phi_M^2} < 30$$

where $N_{10}$ is a quadratic gradient index coefficient of said gradient index lens, and $\phi_M$ is a refractive power of said lens unit.

12. A gradient index lens comprising:
a base lens having a radial gradient index; and
a resin layer formed on a surface of said base lens, said resin layer having an aspherical surface, said resin layer being homogenous, and wherein the following condition is fulfilled:

$$\left|\frac{N_{20}}{\phi_G^4}\right| < 1000$$

wherein $N_{20}$ is a fourth power gradient index coefficient of said gradient index lens, and $\phi_G$ is a refractive power of said gradient index lens.

13. A gradient index lens as claimed in claim 12, wherein said resin layer has a property of being hardened by ultraviolet irradiation.

14. A gradient index lens as claimed in claim 12, wherein said resin layer is formed on one surface of said base lens.

15. A gradient index lens as claimed in claim 14, wherein another resin layer is formed on another surface of said base lens.

16. A gradient index lens as claimed in claim 14, another base lens having a gradient index different from that of said base lens is cemented onto another surface of said base lens.

17. A gradient index lens as claimed in claim 12, wherein another resin layer having a refractive index different from that of said resin layer is formed on a surface of said resin layer.

18. A gradient index lens as claimed in claim 12, wherein said base lens has a spherical surface.

19. A gradient index lens as claimed in claim 12, wherein the following condition is fulfilled:
when $0<H<H_{max}$, $$-6.0 < \frac{\phi_A - \phi_{OA}}{\phi_G} < 6.0$$

where H is a height along a lens diameter, $H_{max}$ is an effective lens diameter, $\phi_A$ is a refractive power of a local surface of said aspherical surface, $\phi_{OA}$ is a refractive power by a reference curvature of said aspherical surface, and $\phi_G$ is a refractive power of said gradient index lens.

20. A gradient index lens as claimed in claim 1, wherein said base lens has a radial gradient index, and wherein the following condition is fulfilled:

$$-1.0 < sgn(\phi_G) \cdot \frac{v_d(H) - v_d(0)}{v_d(0)} < 1.0$$

where $\phi_G$ is a refractive power of said gradient index lens, sgn($\phi_G$)=1 when $\phi_G \geq 0$, sgn($\phi_G$)=−1 when $\phi_G<0$, and $\upsilon d(H)$ is a dispersion value at a point a height H away from an optical axis in a vertical direction in said gradient index lens.

21. A gradient index lens as claimed in claim 1, wherein said gradient index lens constitutes a part of a lens unit having a positive refractive power, and wherein the following condition is fulfilled:

$$-30 < \frac{N_{10}}{\phi_P^2} < 20$$

where $N_{10}$ is a quadratic gradient index coefficient of said gradient index lens, and $\upsilon_P$ is a refractive power of said lens unit.

22. A gradient index lens as claimed in claim 1, wherein said gradient index lens constitutes a part of a lens unit having a negative refractive power, and wherein the following condition is fulfilled:

$$-20 < \frac{N_{10}}{\phi_M^2} < 30$$

where $N_{10}$ is a quadratic gradient index coefficient of said gradient index lens, and $\phi_M$ is a refractive power of said lens unit.

23. A gradient index lens comprising:
a base lens having a radial gradient index; and
a resin layer formed on a surface of said base lens, said resin layer having a aspherical surface, said resin layer being homogenous, wherein the following condition is fulfilled:

when $0<H<H_{max}$, $$-6.0 < \frac{\phi_A - \phi_{OA}}{\phi_G} < 6.0$$

where H is a height along a lens diameter, $H_{max}$ is an effective lens diameter, $C_A$ is a refractive power of a local surface of said aspherical surface, $\phi_{OA}$ is a refractive power by a reference curvature of said aspherical surface, and $\phi_G$ is a refractive power of said gradient index lens.

24. A gradient index lens comprising:
a base lens having a radial gradient index; and
a resin layer formed on a surface of said base lens, said resin layer having an aspherical surface, said resin layer being homogenous, and wherein the following condition is fulfilled:

$$-1.0 < sgn(\phi_G) \cdot \frac{v_d(H) - v_d(0)}{v_d(0)} < 1.0$$

where $\phi_G$ is a refractive power of said gradient index lens, sgn($\phi_G$)=1 when $\phi_G \geq 0$, sgn($\phi_G$)=−1 when $\phi_G<0$, and $\upsilon d(H)$ is a dispersion value at a point a height H away from an optical axis in a vertical direction in said gradient index lens.

25. A gradient index lens comprising:
a base lens having a radial gradient index; and
a resin layer formed on a surface of said base lens, said resin layer having an aspherical surface, said resin layer being homogenous, wherein said gradient index lens constitutes a part of a lens unit having a positive refractive power, and wherein the following condition is fulfilled:

$$-30 < \frac{N_{10}}{\phi_P^2} < 20$$

where $N_{10}$ is a quadratic gradient index coefficient of said gradient index lens, and $\phi_P$ is a refractive power of said lens unit.

26. A gradient index lens comprising:
a base lens having a radial gradient index; and
a resin layer formed on a surface of said base lens, said resin layer having an aspherical surface, said resin layer being homogenous, wherein said gradient index lens constitutes a part of a lens unit having a negative refractive power, and wherein the following condition is fulfilled:

$$-20 < \frac{N_{10}}{\phi_M^2} < 30$$

where $N_{10}$ is a quadratic gradient index coefficient of said gradient index lens, and $\phi_M$ is a refractive power of said lens unit.

* * * * *